May 6, 1958  A. M. BRENNEKE  2,833,606
PISTON RING ASSEMBLY
Filed March 4, 1955
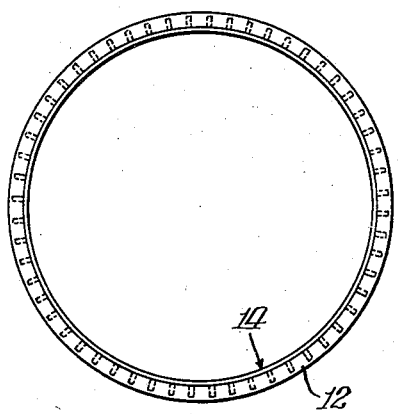
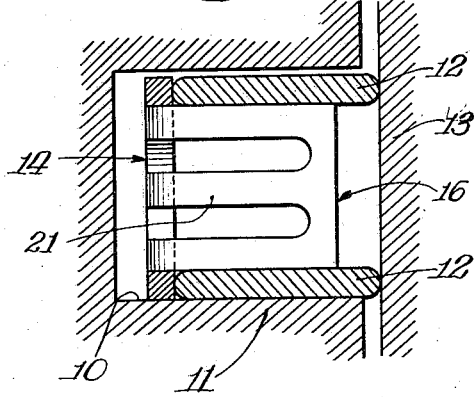
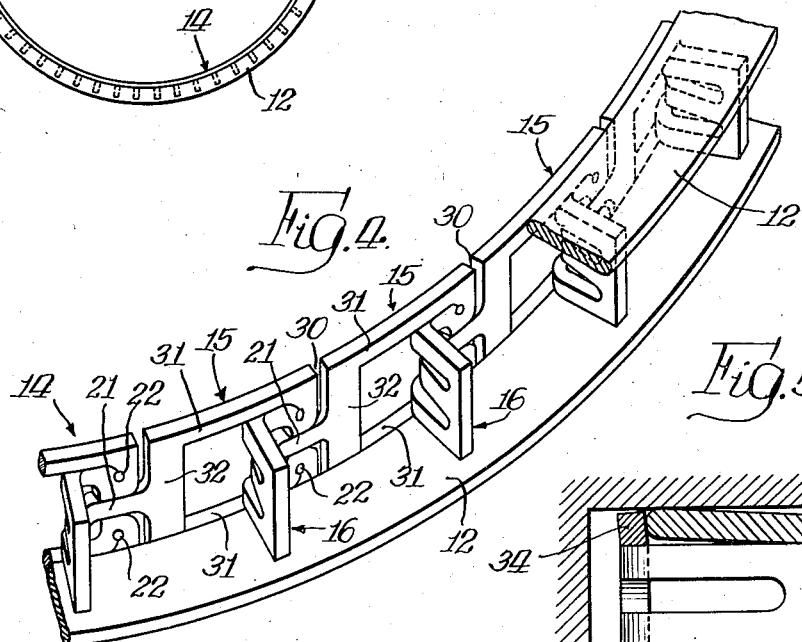
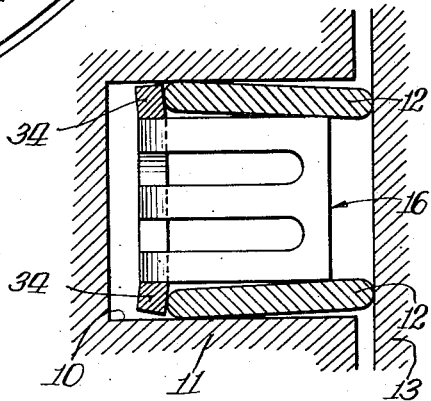
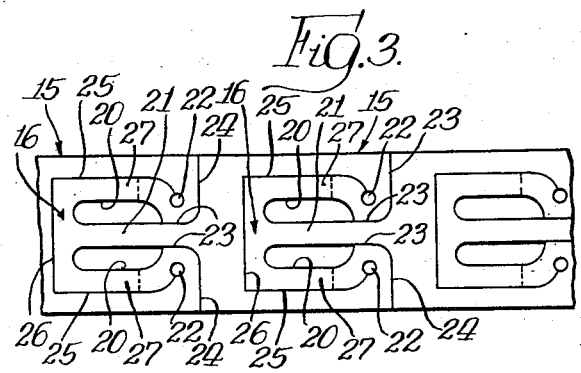
INVENTOR.
Arthur M. Brenneke,
BY
Davis, Lindsey, Hibben & Noyes
Atty's.

United States Patent Office 2,833,606
Patented May 6, 1958

2,833,606
PISTON RING ASSEMBLY

Arthur M. Brenneke, Hagerstown, Ind., assignor to Perfect Circle Corporation, Hagerstown, Ind., a corporation of Indiana Application March 4, 1955, Serial No. 492,233

16 Claims. (Cl. 309—43)

The invention relates generally to piston rings and more particularly to a piston ring assembly including one or more rails.

The general object of the invention is to provide a piston ring assembly having novel combined expanding and positioning means for one or more rails, which is inexpensive to manufacture, which provides substantial support for the rail or rails, and which exerts a uniform expansive force on the rail or rails throughout the circumference thereof.

Another important object is to provide a novel piston ring assembly comprising one or more rails and a combined expanding and positioning means for the rail or rails, which is self-expansible and hence does not have to contact the bottom of the piston ring groove.

A further object is to provide a novel piston ring assembly comprising one or more rails and a combined expanding and positioning means for the rail or rails, the assembly being adapted for use as an oil ring and the combined expanding and positioning means being provided with relatively large openings to permit the oil scraped from the surface of the cylinder to pass freely to the inner part of the piston ring groove.

A still further object is to provide a novel piston ring assembly comprising one or more rails and a combined expanding and positioning means for the rail or rails, said means being so constructed as to cause the rails to seal again the sides of the groove.

Other objects and advantages will become apparent from the following description taken in connection with the accompanying drawings, in which:

Fig. 1 is a plan view of a piston ring assembly embodying the features of the invention;

Fig. 2 is an enlarged transverse sectional view of the ring assembly shown in Fig. 1 and illustrating it in position in a groove in a piston and in engagement with a cylinder wall;

Fig. 3 is a fragmentary elevational view of a strip of material from which a part of the ring assembly is made and illustrating such part in the process of manufacture;

Fig. 4 is a fragmentary perspective view of the ring assembly; and

Fig. 5 is a view similar to Fig. 2 showing a modified construction.

The present ring assembly is of the type comprising one or more steel rails, in this instance a pair, adapted to engage the cylinder wall, and a combined expanding and positioning or spacer means for holding the rail or rails axially in the desired position in the groove and for forcing them outwardly against the cylinder wall. The novel features of the invention lie in the construction of the combined spacer and expander and its cooperation with the rails. The combined spacer and expander comprises generally a plurality of circumferentially arranged sections which together form a band at the inner periphery of the assembly. Each section is provided with a slitted tongue formed from a single layer of material and extending outwardly with its side edges engaging the two rails to hold them in axially spaced relation at the sides of the groove. The sections themselves are provided with portions which engage the inner peripheries of the rails to force them outwardly, and the sections are resiliently connected together for circumferential expansion by the outwardly extending tongues.

In Fig. 2 of the drawing, I have shown a ring of this construction mounted in a groove 10 formed in a piston fragmentarily shown at 11. As mentioned above, the ring assembly includes two rails 12 which are adapted to engage and press outwardly against the cylinder wall indicated fragmentarily at 13.

In the preferred embodiment as illustrated in the drawing, the combined spacer and expander, indicated generally at 14, comprises a plurality of sections, each being indicated generally at 15. As mentioned above, each section is provided with an outwardly extending tongue indicated at 16 to support the rails 12 in axially spaced relation.

The detailed construction of the combined spacer and expander 14 can best be described by first describing the manner in which it is formed. Thus, as shown in Fig. 3, I provide an elongated strip of sheet metal which is punched with a series of pairs of slots 20, the slots of each pair being axially spaced to provide a center or inner arm 21. The strip is also punched with a series of pairs of small holes 22. The strip is then sheared along lines 23 extending longitudinally of the strip from the slots 20 and along transverse lines 24 extending from the lines 23 laterally towards the respective sides of the strip. The shears 24 thus separate the strip into the sections 15.

The sections have inner generally rectangular areas punched therefrom, and to this end the strip is also sheared along longitudinally extending lines 25 extending from the small holes 22 parallel to the opposite sides of the strip, and the longitudinal shears 25 are connected by a transverse shear 26. The shears 25 and 26 thus form the tongues 16, one in each section 15, and each being generally rectangular. Each tongue 16 is connected by the central arm 21 to the next adjacent section and is connected to the section from which it is formed by laterally spaced arms 27. The small holes 22 at the ends of the shears 25 are provided to prevent the metal from shearing beyond the holes 22.

When the strip is punched and sheared in the above described manner, the strip is formed into a circle and the tongues 16 are then bent outwardly at right angles to the plane of the strip, as clearly shown in Fig. 4. The strip is then stretched to separate the sections 15 and provide gaps 30 therebetween. In stretching the strip for this purpose, the outwardly extending portions of the central arm 21 and the upper and lower arms 27 flex relative to the plane of the tongue. When the combined spacer and expander is set in this condition, such flexing provides a resilient connection between the sections 15. When the combined spacer and expander is placed within a cylinder and in contact with the rails, it is compressed so that the resilient connection afforded by the tongues tends to expand the combined expander and spacer circumferentially and thus will exert an outward force against the rails.

It will be noted from an inspection of Fig. 3 that the sections are generally rectangular, and by punching the tongues 16 and bending them outwardly, each section has the form of a rectangular frame comprising upper and lower side bars 31 connected at one end by a transversely extending end bar 32. The central arm 21 of the tongue is connected to the end bar 32 of an adjacent section, while the opposite ends of the side bars 31 are connected to the tongue by the two side arms 27. The axial width of the tongues is such that the rails 12 are held in the desired axially spaced relation, and the upper and lower side bars 31 are located axially above the upper and lower edges of the tongue so that the side bars can contact the inner peripheries of the rails 12, as is clearly illustrated in Figs. 2 and 4. Thus, the resilient connection of the tongues tends to expand the combined spacer and expander circumferentially so that the side bars 31 exert an outward pressure against the rails 12 throughout the circumference thereof and hold the rails against the cylinder wall to provide the desired sealing relation therewith.

In the form of invention shown in Fig. 2, the side bars 31 are axially aligned with the end bar 32 so that the side bars 31 stand at a right angle to the plane of the rails 12 and thus exert purely an outward pressure on the rails. The rails, however, in this construction have a slight clearance between them and adjacent sides of the groove so that the rails can freely move radially to conform to the contour of the cylinder wall.

In the construction shown in Fig. 5 the combined spacer and expander is arranged to exert not only an outward pressure on the rails 12 but also a slight axial pressure at the inner peripheries of the rails to cause the inner peripheries to engage the adjacent sides of the groove and thus provide a side seal. To this end, the side bars of each section are tilted inwardly at a slight angle as indicated at 34 in Fig. 5. With such angle, the side bars 34 exert mainly an outward pressure on the rails but also a slight axial pressure at the inner peripheries of the rails. Since rails of this type have a tendency to dish, such pressure against the inner peripheries tends to cause the rails to dish, as illustrated in Fig. 5, so that the inner peripheral edge portions of the rails engage the sides of the groove to effect a seal therewith. While, in Fig. 5, both rails are shown in a dished position, either or both of the rails at different points in the engine cycle may lie flat against the sides of the grooves while side pressure at the inner periphery is maintained, the rails in Fig. 5 being shown as they are merely to indicate that there is side pressure at the inner periphery. Since the angle at which the side bars 34 are bent is relatively slight, only a slight side pressure is exerted on the rails. This is sufficient to effect a seal but does not produce excessive friction with the sides of the groove so that the rails are free to expand radially to follow the contour of the piston wall.

The side seal effected in this manner is advantageous particularly in engines which have a high vacuum condition during a portion of each cycle, since the side seal prevents oil from being drawn upwardly in the cylinder from the back of the groove where oil scraped from the cylinder walls by the rails collects.

With the foregoing construction, it is evident that I have provided a piston ring assembly having a novel combined positioning and expanding means for one or more rails. This means is inexpensive to manufacture since it may be made from a sheet metal strip and it provides substantial support for the rail or rails and exerts a uniform expansive force on the rails throughout the circumference thereof. The combined expander and positioning means is self-expansible so that it does not have to abut the bottom of the piston ring groove in order to exert its pressure. The piston ring assembly shown herein is particularly adapted for use as an oil ring and the rectangular frame like construction of the sections provides large openings which permit the oil scraped from the surface of the cylinder to pass freely to the inner part of the groove. With the form shown in Fig. 5, a side seal is provided so that the oil collected in the inner part of the groove cannot be drawn upwardly in the cylinder during a high vacuum condition therein.

I claim:

1. A piston ring assembly comprising a rail, and a combined expanding and positioning means for holding the rail adjacent one side of the piston ring groove, said means comprising a plurality of circumferentially arranged sections connected by slitted tongues, each comprising a single layer of material extending outwardly from the sections with the inner end of said layer connected to two adjoining sections.

2. A piston ring assembly comprising a rail, and a combined expanding and positioning means for holding the rail adjacent one side of the piston ring groove, said means comprising a plurality of circumferentially arranged sections, and a plurality of outwardly extending tongues, each tongue having a slit and having relatively bendable portions separated by the slit and connected to adjoining sections.

3. A piston ring assembly comprising a rail, and a combined expanding and positioning means for holding the rail adjacent one side of the piston ring groove, said means comprising a plurality of circumferentially arranged sections forming a generally cylindrical band bearing at one edge against the inner periphery of the rail, and a plurality of spring tongues each punched from the area of a section and bent outwardly from the sections to support the rail and having relatively bendable portions connecting adjoining sections.

4. A piston ring assembly comprising a pair of axially spaced rails, and a combined expanding and spacing means for holding the rails in spaced relation and for forcing the rails outwardly, said means comprising a generally cylindrical band comprising a plurality of relatively movable sections with the upper and lower edge portions of the band bearing outwardly against the inner peripheries of the rails, and a plurality of slitted tongues connecting the sections and each punched from the area of a section and extending outwardly between the rails to hold them in spaced relation.

5. A piston ring assembly comprising a pair of axially spaced rails, and a combined expanding and spacing means for holding the rails in spaced relation and for forcing the rails outwardly, said means comprising a plurality of circumferentially arranged sections, each comprising a generally rectangular frame with the upper and lower sides of the frame bearing outwardly against the rails, and a plurality of outwardly extending tongues formed from the portions of material within the frames and resiliently connecting adjoining sections, said tongues holding the rails in axially spaced relation.

6. A piston ring assembly comprising a pair of axially spaced rails, and a combined expanding and spacing means for holding the rails in spaced relation and for forcing the rails outwardly, said means comprising a plurality of circumferentially arranged sections, each being generally rectangular with the upper and lower sides thereof bearing outwardly against the rails, and each having an inner generally rectangular area punched therefrom and extending outwardly between the rails and resiliently connected to an adjoining section.

7. A piston ring assembly comprising a pair of axially spaced rails, and a combined expanding and spacing means for holding the rails in spaced relation and for forcing the rails outwardly, said means comprising a plurality of circumferentially arranged sections, each comprising upper and lower side bars bearing outwardly against the rails and integrally connected at one end by an end bar, and a plurality of outwardly extending tongues located between the rails, each tongue having outer arms connected to the respective side bars of one section and an inner arm between the outer arms and connected to the end bar of an adjoining section.

8. A piston ring assembly comprising a pair of axially spaced rails, and a combined expanding and spacing means for holding the rails in spaced relation and for forcing the rails outwardly, said means comprising a plurality of circumferentially arranged sections bearing outwardly against the rails and a plurality of outwardly extending tongues located between the rails and each tongue having three arms in side-by-side relation, the outer two arms being connected to one section and the intermediate arm connected to an adjoining section.

9. A piston ring assembly comprising a pair of axially spaced rails, and a combined expanding and spacing means for holding the rails in spaced relation and for forcing the rails outwardly, said means comprising a plurality of circumferentially arranged sections bearing outwardly against the rails, and a plurality of outwardly extending tongues located between the rails, each tongue having a pair of slots axially spaced from the upper and lower edges of the tongue and from each other, and forming relatively bendable arms connecting adjoining sections.

10. A piston ring assembly comprising a pair of axially spaced rails, and a combined expanding and spacing means for holding the rails in spaced relation and for forcing the rails outwardly, said means comprising a plurality of circumferentially arranged sections bearing outwardly against the rails, and a plurality of outwardly extending tongues located between the rails, each tongue having a pair of axially spaced slots extending outwardly in the tongue but terminating inwardly of the outer edge of the tongue and forming interconnected relatively bendable arms connecting adjoining sections.

11. A piston ring assembly comprising a pair of axially spaced rails, and a combined expanding and spacing means for holding the rails in spaced relation and for forcing the rails outwardly, said means comprising a plurality of circumferentially arranged sections bearing outwardly against the rails, and means resiliently connecting adjoining sections comprising upper and lower arms extending outwardly from each section and holding the respective rails in spaced relation, means connecting the outer ends of said arms, and an intermediate arm located between said upper and lower arms and connected to said last-mentioned means and to an adjoining section.

12. A piston ring assembly comprising a pair of axially spaced rails, and a combined expanding and spacing means for holding the rails in spaced relation and for forcing the rails outwardly, said means comprising a plurality of circumferentially arranged sections bearing outwardly against the rails, and means resiliently connecting adjoining section comprising a single layer piece extending outwardly between the rails and radially slitted to form portions respectively connecting two adjoining sections.

13. A piston ring assembly comprising a pair of axially spaced rails, and a combined expanding and spacing means for holding the rails in spaced relation and for forcing the rails outwardly, said means comprising a plurality of circumferentially arranged sections bearing outwardly against the rails, and means resiliently connecting adjoining sections comprising a single layer piece positioned in an axial plane with its upper and lower edges engaging the respective rails and radially slitted to form portions connected to adjoining sections.

14. A piston ring assembly comprising a pair of axially spaced rails, and a combined expanding and spacing means for holding the rails in spaced relation and for forcing the rails outwardly, said means comprising a plurality of circumferentially arranged sections, and a plurality of tongues having axially extending edges forming the outer ends thereof and extending outwardly between the rails and resiliently connecting the sections, said sections having upper and lower side bars tilted inwardly and bearing against the rails to force them outwardly and the inner periphery thereof against the sides of the groove.

15. A combined spacer and expander for a pair of rails of a piston ring assembly, comprising a plurality of circumferentially arranged sections, each section having its central portion punched and bent to extend radially outward and slitted to provide relatively bendable portions connecting the section with an adjoining section.

16. A combined spacer and expander for a pair of rails of a piston ring assembly, comprising a plurality of circumferentially arranged sections, each section having its central portion punched and bent to extend radially outward and having a pair of slits providing upper and lower arms connected to the section and an intermediate arm connected to an adjoining section.

References Cited in the file of this patent

UNITED STATES PATENTS

| | | |
|---|---|---|
| 2,345,589 | Englehardt | Apr. 4, 1944 |
| 2,596,286 | Phillips | May 13, 1952 |
| 2,635,022 | Shirk | Apr. 14, 1953 |
| 2,680,045 | Hamm | June 1, 1954 |
| 2,695,825 | Estey | Nov. 30, 1954 |